United States Patent
Pezeshki et al.

(10) Patent No.: US 11,626,950 B2
(45) Date of Patent: Apr. 11, 2023

(54) DIFFERENTIAL REPORTING OF EPRE VALUES FOR RS TONES

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/174,221

(22) Filed: Feb. 11, 2021

(65) Prior Publication Data

US 2022/0255694 A1 Aug. 11, 2022

(51) Int. Cl.
*H04L 5/00* (2006.01)
*H04W 72/0453* (2023.01)

(52) U.S. Cl.
CPC ....... *H04L 5/0048* (2013.01); *H04W 72/0453* (2013.01)

(58) Field of Classification Search
CPC ... H04B 7/0632; H04L 5/0048; H04L 5/0057; H04W 52/146; H04W 52/241; H04W 88/085
See application file for complete search history.

(56) References Cited

U.S. PATENT DOCUMENTS

| 2014/0204853 A1* | 7/2014 | Ko ..................... H04L 5/0048 370/329 |
| 2014/0355529 A1 | 12/2014 | Zhu et al. |
| 2015/0282124 A1* | 10/2015 | Miao .................. H04L 25/0222 455/450 |
| 2015/0296385 A1* | 10/2015 | Zhang .................. H04L 5/0094 370/329 |
| 2018/0062811 A1* | 3/2018 | Akkarakaran ....... H04B 7/0617 |
| 2021/0067297 A1* | 3/2021 | Farmanbar ........... H04L 5/0096 |

* cited by examiner

*Primary Examiner* — Mansour Oveissi
(74) *Attorney, Agent, or Firm* — Procopio, Cory, Hargreaves & Savitch LLP

(57) ABSTRACT

A receiving device may be either a UE or a base station. The receiving device may receive, from a transmitting device, communication based on a current reference signal (RS) pattern. The receiving device may determine, based on the received communication, at least one updated RS pattern for at least one resource block (RB). The at least one updated RS pattern may include at least one updated energy per resource element (EPRE) value for one or more RS tones. Further, the receiving device may transmit, to the transmitting device, a report of the at least one updated RS pattern. The report may correspond to at least one of an absolute value or a relative value of the at least one updated EPRE value for the one or more RS tones.

26 Claims, 9 Drawing Sheets

DIFFERENTIAL REPORTING OF EPRE VALUES FOR RS TONES

BACKGROUND

Technical Field

The present disclosure relates generally to communication systems, and more particularly, to reporting of energy values for reference signal tones in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Optimized custom reference signal (RS) patterns may be determined utilizing machine learning techniques. Both the transmitting device and the receiving device (either of which may be a user equipment (UE) or a base station) may become aware of the custom RS pattern in order to utilize the custom RS pattern. For example, if the custom RS pattern is determined at a receiving device, the custom RS pattern may be communicated to the transmitting device, so that the custom RS pattern may be utilized for future communications. Communicating the custom RS pattern may include communicating the energy per resource element (EPRE) values for the different RS tones specified in the RS pattern. Communicating all the EPRE values as absolute values may lead to a large communication overhead.

In an aspect of the disclosure, a method, a computer-readable medium, and an apparatus are provided. The apparatus may be a receiving device, which may be either a UE or a base station. The apparatus may receive, from a transmitting device, communication based on a current RS pattern. The apparatus may determine, based on the received communication, at least one updated RS pattern for at least one resource block (RB). The at least one updated RS pattern may include at least one updated EPRE value for one or more RS tones. Further, the apparatus may transmit, to the transmitting device, a report of the at least one updated RS pattern. The report may correspond to at least one of an absolute value or a relative value of the at least one updated EPRE value for the one or more RS tones.

In an aspect of the disclosure, a method, a computer-readable medium, and an apparatus are provided. The apparatus may be a transmitting device, which may be either a UE or a base station. The apparatus may transmit, to a receiving device, communication based on a current RS pattern. The apparatus may receive, from the receiving device, a report of at least one updated RS pattern for at least one RB. The report may correspond to at least one of an absolute value or a relative value of at least one updated EPRE value for one or more RS tones. Further, the apparatus may determine, based on the received report, whether to communicate with the receiving device based on the current RS pattern, the at least one updated RS pattern, or at least one adjusted RS pattern based on the at least one updated RS pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
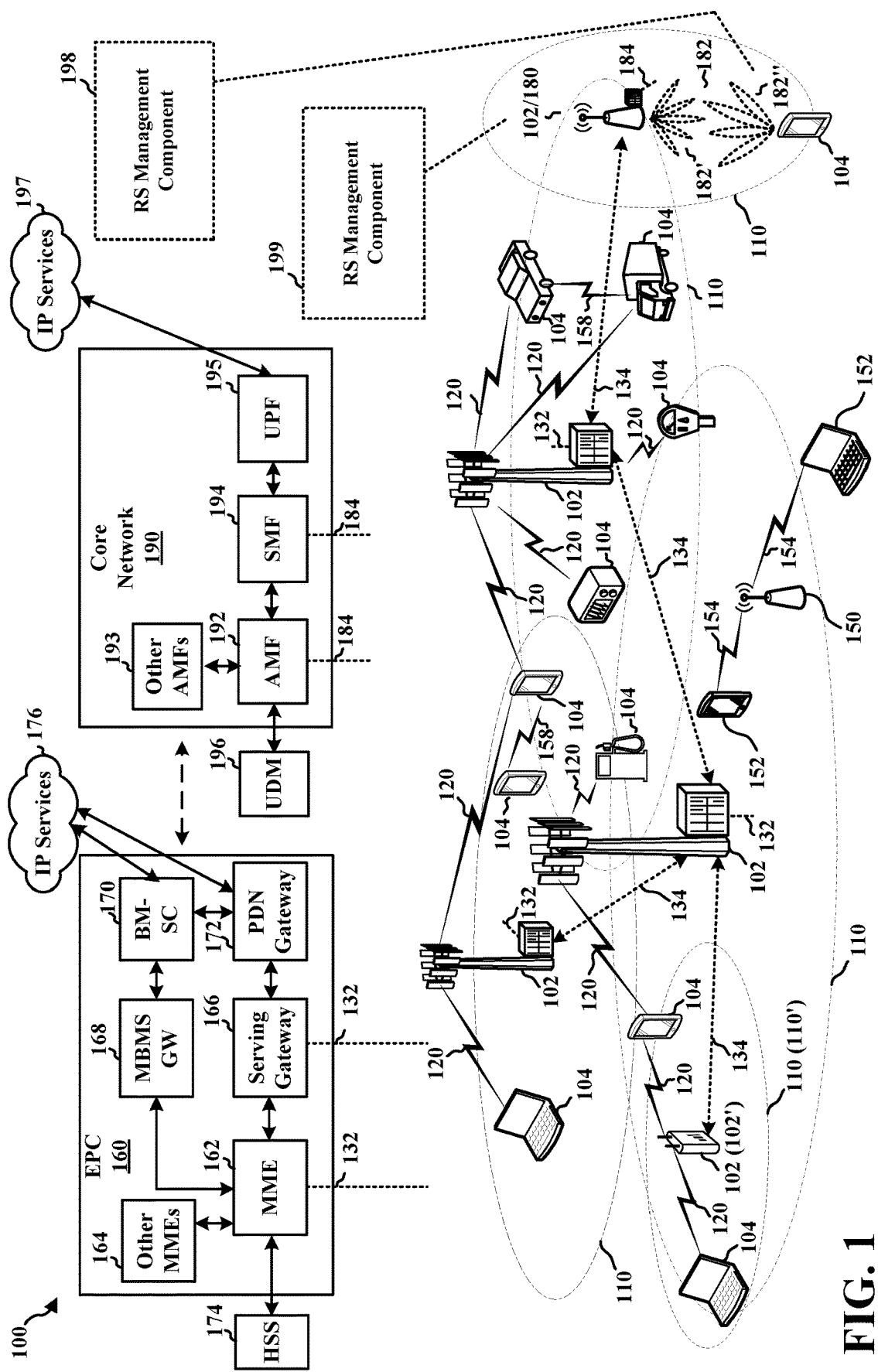
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an RS management component 198. In certain aspects, the base station 180 may include an RS management component 199. In different scenarios, either the UE 104 or the base station 180 may act as the receiving device or the transmitting device. When the UE 104 or the base station 180 acts as the receiving device, the RS management component 198/199 may receive, from a transmitting device, communication based on a current RS pattern. The RS management component 198/199 may determine, based on the received communication, at least one updated RS pattern for at least one RB. The at least one updated RS pattern may include at least one updated EPRE value for one or more RS tones. Further, the RS management component 198/199 may transmit, to the transmitting device, a report of the at least one updated RS pattern. The report may correspond to at least one of an absolute value or a relative value of the at least one updated EPRE value for the one or more RS tones.

When the UE 104 or the base station 180 acts as the transmitting device, the RS management component 198/199 may transmit, to a receiving device, communication based on a current RS pattern. The RS management component 198/199 may receive, from the receiving device, a report of at least one updated RS pattern for at least one RB. The report may correspond to at least one of an absolute value or a relative value of at least one updated EPRE value for one or more RS tones. Further, the RS management component 198/199 may determine, based on the received report, whether to communicate with the receiving device based on the current RS pattern, the at least one updated RS pattern, or at least one adjusted RS pattern based on the at least one updated RS pattern. Although the following description may be focused on 5G NR, the concepts described herein may be applicable to other similar areas, such as LTE, LTE-A, CDMA, GSM, and other wireless technologies.

Figure 2:
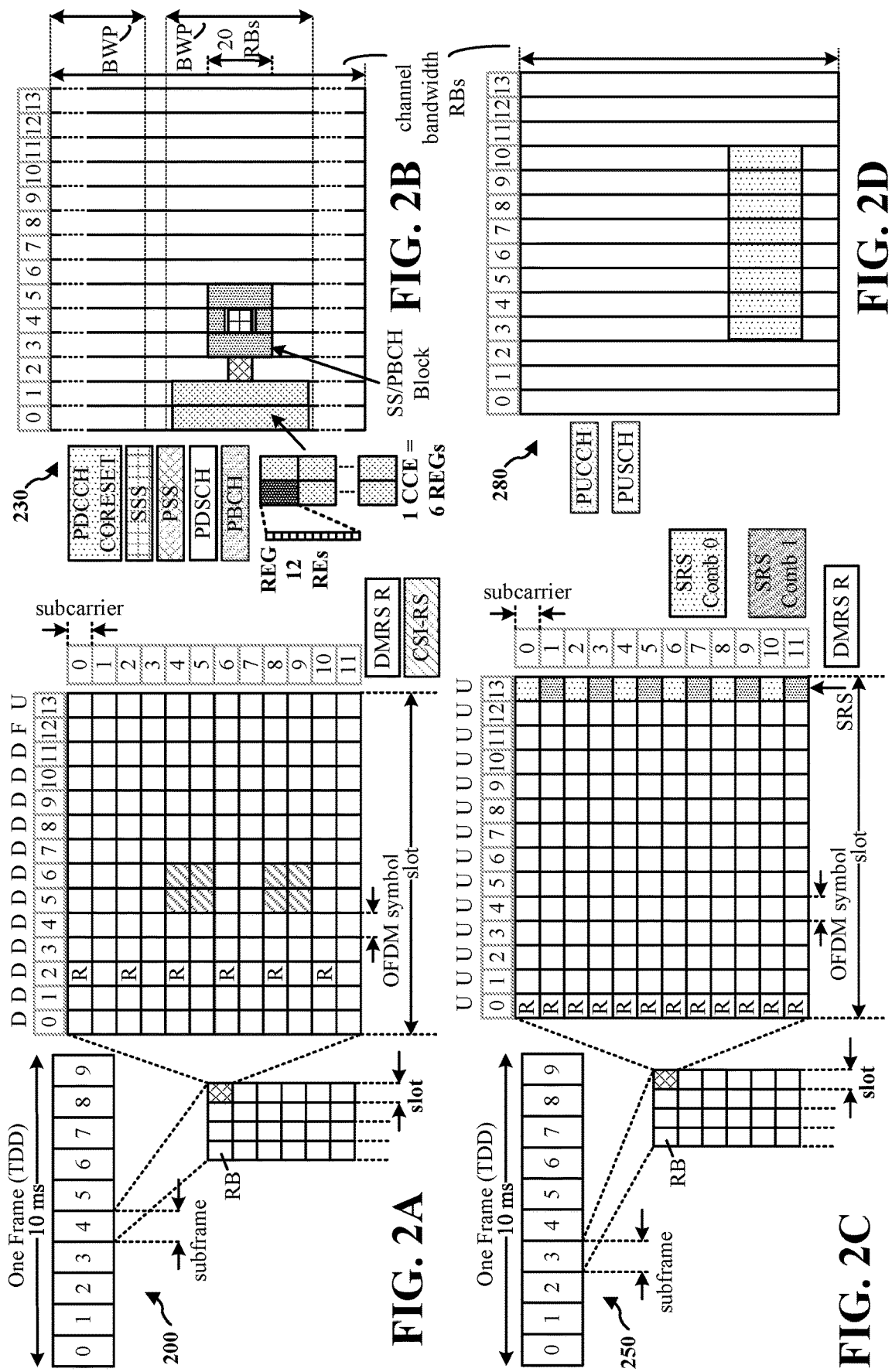
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes an RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
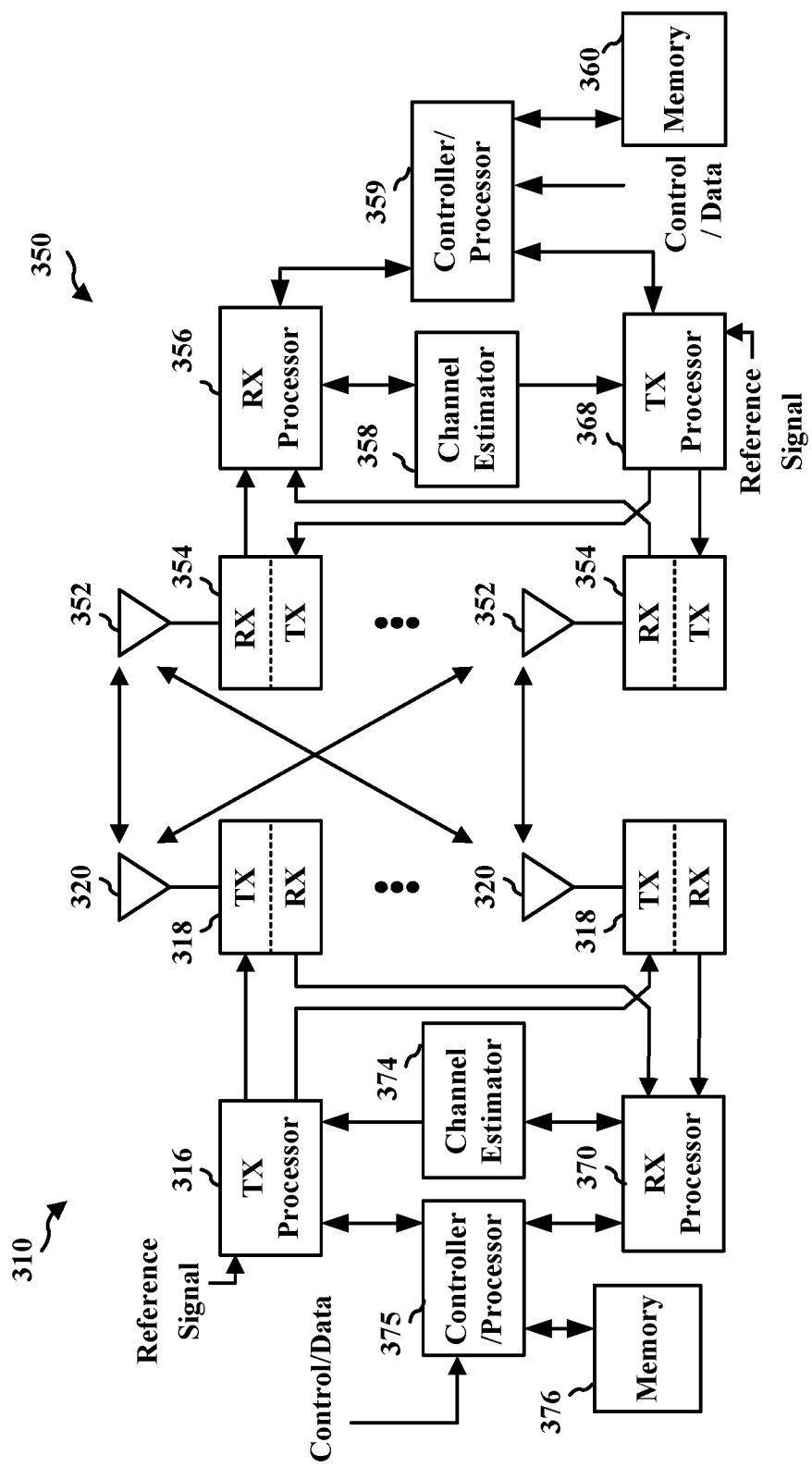
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Reference signals, such as the demodulation reference signal (DMRS), the phase tracking reference signal (PTRS), the CSI-RS, the tracking referencing signal (TRS), or the SRS may be associated with predefined or preconfigured RS patterns. An RS pattern may include the locations of reference signal tones in time-frequency resources and EPRE values for the reference signal tones (also referred to as pilot tones). A synchronized knowledge about the RS pattern at a transmitting device and at a receiving device may enable the performance of the corresponding measurements based on the reference signal. In some aspects herein, an RS tone may refer to the RS transmitted within a same subcarrier. In some aspects where the energy level of the RS transmitted within a same subcarrier varies with time, an RS tone may also refer to the RS transmitted within the subcarrier and within a time period.

The predefined or preconfigured RS pattern may not be optimal for the communication between the transmitting device and the receiving device due to, for example, channel selectivity of the channel between the transmitting device and the receiving device. The machine learning, or neural network, technique may be utilized, through a training process over time, to generate more optimized custom RS patterns for the specific deployment of the transmitting device and the receiving device. In one aspect, the training process may be performed at the receiving device, which may be either a UE or a base station. In another aspect, the training process may be performed at another device.

To utilize the custom RS pattern for measurements and communications, both the transmitting device and the receiving device may synchronize the information about the RS pattern to be utilized (i.e., to be on the same page) including the EPRE values for the different RS tones across time and frequency. In one aspect, the receiving device, which may be either a UE or a base station, may determine the custom RS pattern including the EPRE values across the RS tones and communicate the EPRE values to the transmitting device, such that both the transmitting device and the receiving device (e.g., both the UE and the base station) may have the information about the custom RS pattern including the EPRE values, and may perform the RS-based measurements accordingly.

Communicating all the EPRE values as absolute values may lead to large communication overhead. Accordingly, it may be beneficial to provide reporting techniques with the ability to reduce communication overhead. In some aspects of the present disclosure, a differential reporting technique may be utilized for the reporting of the EPRE values for the RS tones. For instance, relative values may be utilized to reduce the communication overhead. One or more RS tones or sets of RS tones may be defined as reference RS tones, and the EPRE values for the reference RS tones may be communicated as absolute values. The EPRE values for other RS tones may be communicated as relative values.

Figure 4:
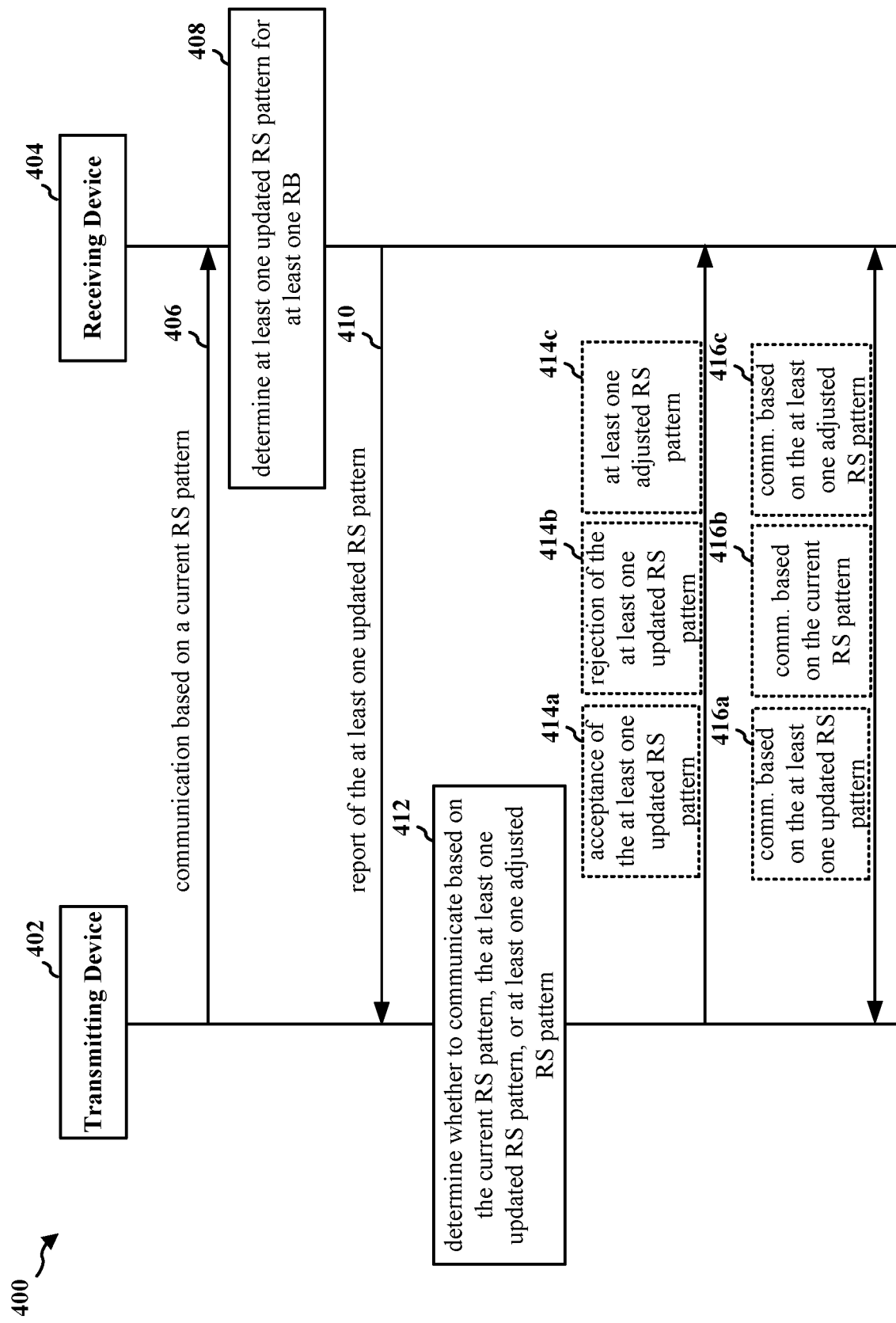
FIG. 4 is a communication flow according to one aspect.

FIG. 4 is a communication flow 400 according to one aspect. The transmitting device 402 may correspond to a UE and/or a base station and the receiving device 404 may correspond to a UE and/or a base station. For example, when the transmitting device 402 corresponds to a UE, the receiving device 404 may correspond to a base station; when the transmitting device 402 corresponds to a base station, the receiving device 404 may correspond to a UE. At 406, the transmitting device 402 may transmit to the receiving device 404, and the receiving device 404 may receive from the transmitting device 402, communication based on a current RS pattern. The current RS pattern may be a predefined or preconfigured RS pattern. At 408, the receiving device 404 may determine, based on the received communication, at least one updated RS pattern for at least one RB. The at least one updated RS pattern may include at least one updated EPRE value for one or more RS tones. The at least one updated RS pattern may further include a mapping of the RS in the at least one RB (i.e., the locations of the REs configured for the RS within the time-frequency resources of the at least one RB). In one aspect, the receiving device 404 may determine the at least one updated RS pattern using a machine learning algorithm or a neural network through a training process. At 410, the receiving device 404 may transmit to the transmitting device 402, and the transmitting device 402 may receive from the receiving device 404, a report of the at least one updated RS pattern. The report may correspond to at least one of an absolute value or a relative value of the at least one updated EPRE value for the one or more RS tones. At 412, the transmitting device 402 may determine, based on the received report, whether to communicate with the receiving device 404 based on the current RS pattern, the at least one updated RS pattern, or at least one adjusted RS pattern based on the at least one updated RS pattern.

In one aspect, the transmitting device 402 may determine at 412 to communicate with the receiving device 404 based on the at least one updated RS pattern. Accordingly, at 414a, the transmitting device 402 may transmit to the receiving device 404, and the receiving device 404 may receive from the transmitting device 402, a notification of acceptance of the at least one updated RS pattern. At 416a, the transmitting device 402 and the receiving device 404 may communicate with each other based on the at least one updated RS pattern.

In one aspect, the transmitting device 402 may determine at 412 to communicate with the receiving device 404 based on the current RS pattern. Accordingly, at 414b, the transmitting device 402 may transmit to the receiving device 404, and the receiving device 404 may receive from the transmitting device 402, a notification of rejection of the at least one updated RS pattern. At 416b, the transmitting device 402 and the receiving device 404 may communicate with each other based on the current RS pattern. In some aspects, the rejection of the at least one updated RS pattern may be implicit. In other words, absent of either a notification of acceptance of the at least one updated RS pattern or a notification of at least one adjusted RS pattern based on the updated RS pattern, the transmitting device 402 and the receiving device 404 may continue to communicate with each other based on the current RS pattern.

In one aspect, the transmitting device 402 may determine at 412 to communicate with the receiving device 404 based on at least one adjusted RS pattern based on the at least one updated RS pattern. Accordingly, at 414c, the transmitting device 402 may transmit to the receiving device 404, and the receiving device 404 may receive from the transmitting device 402, a notification of at least one adjusted RS pattern. The at least one adjusted RS pattern may be determined by the transmitting device 402 based on the at least one updated RS pattern. For example, the transmitting device 402 may specify in the adjusted RS pattern EPRE values that fall between the corresponding EPRE values in the current RS pattern and the corresponding EPRE values in the at least one updated RS pattern. At 416c, the transmitting device 402 and the receiving device 404 may communicate with each other based on the at least one adjusted RS pattern.

Figure 5:
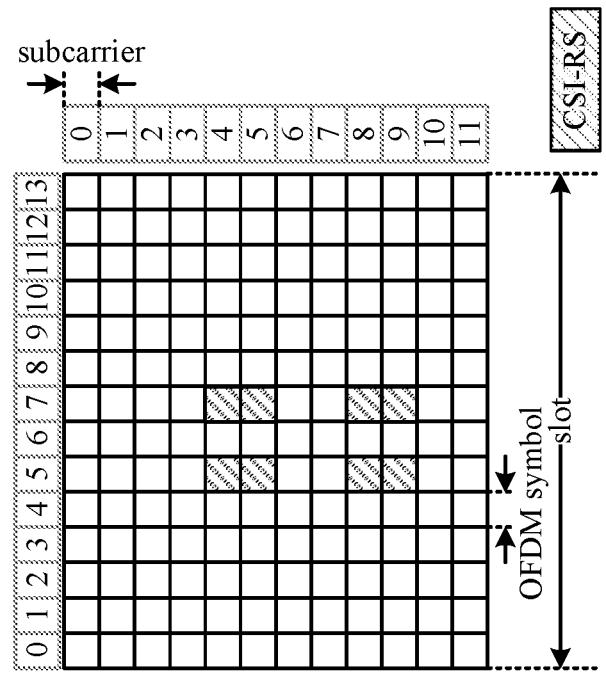
FIG. 5 is a diagram illustrating an example resource block in which the CSI-RS is transmitted.

FIG. 5 is a diagram illustrating an example resource block 500 in which a CSI-RS is transmitted. The RS pattern of the CSI-RS for the RB 500 illustrated in FIG. 5 may correspond to an updated RS pattern determined at the receiving device 404 at 408. FIG. 5 is illustrative, and does not limit the disclosure. The updated RS pattern may include the mapping of the RS in the RB 500. In particular, in FIG. 5, the 8 REs at symbol 5, subcarriers 4, 5, 8, and 9, and at symbol 7, subcarriers 4, 5, 8, and 9 may be configured for the RS. The updated RS pattern may specify the EPRE values for the RS tones at subcarriers 4, 5, 8, and 9. In another aspect, the updated RS pattern may specify the EPRE values for the RS at each of the individual REs configured for the RS. The EPRE values may be communicated from the receiving device 404 to the transmitting device 402 at 410 when the report of the updated RS pattern is communicated from the receiving device 404 to the transmitting device 402. As indicated previously, transmitting all the EPRE values as absolute values in the report may lead to a large communication overhead. Accordingly, differential reporting of EPRE values where some of the EPRE values are transmitted as relative values in the report may be utilized.

The receiving device 404 may specify a certain set of RS tones in the report as reference RS tones, and may communicate in the report the absolute values for the EPRE values for the reference RS tones to the transmitting device 402. The receiving device 404 may convey a list of RS tones, and may specify the reference RS tones based on a certain rule, i.e., a predetermination or a preconfiguration. The receiving device 404 may communicate the relative values for the EPRE values for all other RS tones (i.e., non-reference RS tones). Herein reference RS tones may also be referred to as first RS tones, and non-reference RS tones may also be referred to as second RS tones. A relative value for an EPRE value for a non-reference RS tone may correspond to a difference between the EPRE value for the non-reference RS tone and the EPRE value for a reference RS tone, or may correspond to a difference between the EPRE value for the non-reference RS tone and the EPRE value for another non-reference RS tone (for example, the another non-reference RS tone may be either of the non-reference RS tones that neighbor in frequency), such that the EPRE value for any non-reference RS tone may be calculated at the transmitting device 402 based on one absolute value and one or more relative values.

For example, referring to FIG. 5, the receiving device 404 may specify in the report that the RS tone at subcarrier 4 is a reference RS tone. The RS tones at subcarriers 5 and 8 may thus be a non-reference RS tones, and the receiving device 404 may specify in the report relative values for the EPRE values for the RS tones at subcarriers 5 and 8. The relative value for the EPRE value for the RS tone at subcarrier 5 may correspond to a difference between the EPRE value for the RS tone at subcarrier 5 and the EPRE value for the RS tone at subcarrier 4 (i.e., the reference RS tone). Therefore, the transmitting device 402, upon receiving the report, may calculate the absolute value for the EPRE value for the RS tone at subcarrier 5 based on the absolute value for the EPRE value for the RS tone at subcarrier 4 and the relative value for the EPRE value for the RS tone at subcarrier 5. Further, in different aspects, the relative value for the EPRE value for the RS tone at subcarrier 8 may correspond to either a difference between the EPRE value for the RS tone at subcarrier 8 and the EPRE value for the RS tone at subcarrier 4 (i.e., the reference RS tone) or a difference between the EPRE value for the RS tone at subcarrier 8 and the EPRE value for the RS tone at subcarrier 5 (i.e., another non-reference RS tone). In case the relative value for the EPRE value for the RS tone at subcarrier 8 corresponds to a difference between the EPRE value for the RS tone at subcarrier 8 and the EPRE value for the RS tone at subcarrier 5, the transmitting device 402 may calculate the absolute value for the EPRE value for the RS tone at subcarrier 8 based on the absolute value for the EPRE value for the RS tone at subcarrier 5, which has been calculated above, and the relative value for the EPRE value for the RS tone at subcarrier 8.

In one aspect, the RS tone(s) having the lowest and/or highest index on the list may be implicitly specified as the reference RS tone(s). For example, if the RS tones are listed in the report in the order of the subcarrier index, in the example illustrated in FIG. 5, either the RS tone at subcarrier 4 (i.e., corresponding to the lowest index) and/or the RS tone at subcarrier 9 (i.e., corresponding to the highest index) may be the reference RS tone(s) by implicit specification. In another aspect, the receiving device 404 may explicitly specify one or more RS tones as the reference RS tones and communicate absolute values for the EPRE values for these reference tones in the report. For example, in FIG. 5, the receiving device 404 may explicitly specify that the RS tone at subcarrier 5 is a reference RS tone, and may communicate the absolute value for the reference RS tone at subcarrier 5. The remaining RS tones may be non-reference RS tones, and receiving device 404 may communicate relative values for the EPRE values for the non-reference RS tones.

In one aspect, the updated RS pattern may include RS with EPRE values that vary with time. Accordingly, the differential reporting technique may also be utilized over the time domain. For example, the receiving device 404 may indicate in the report for the transmitting device 402 that the EPRE value for the RS may be increased or decreased by a certain amount (i.e., the receiving device 404 may indicate a difference) with respect to the previous EPRE value in an immediately preceding time instance. For example, referring to FIG. 5, the receiving device 404 may indicate in the report for the transmitting device 402 that the EPRE values for the RS at symbol 7 may be increased or decreased by a certain amount with respect to the EPRE values for the RS at symbol 5. In different aspects, the variation of the EPRE values over time may be applicable to some or all of the subcarriers.

In different aspects, the EPRE values may be specified in the report at different levels of granularity. The EPRE values may be specified at the level of individual RS tones in the examples above. In another aspect, the EPRE values may be specified at the level of sets of RS tones. For example, the receiving device 404 may specify in the report that the first $n_1$ indices may be associated with an absolute EPRE value $P_1$ and the next $n_2$ indices may be associated with a relative EPRE value $P_2$, etc. For example, referring to FIG. 5, the receiving device 404 may specify in the report that the RS tones at subcarriers 4 and 5 may be reference RS tones that may be associated with a first EPRE value, represented as an absolute value, and that the RS tones at subcarriers 8 and 9 may be non-reference RS tones that may be associated with a second EPRE value, represented as a value relative to the first EPRE value.

In further aspects, the EPRE values may be specified in the report at even coarser levels of granularity. For example, The EPRE values may be specified at the level of RBs or even the level of sets of RBs.

In one aspect, the receiving device 404 may signal, in the report, a tone mask for one or more RS tones. The RS tones that are associated with a tone mask may have a zero EPRE value. For example, referring to FIG. 5, the receiving device 404 may signal in the report a tone mask for the RS tone at subcarrier 5. Accordingly, the transmitting device 402 may transmit zero energy at REs configured for the RS at subcarrier 5.

Figure 6:
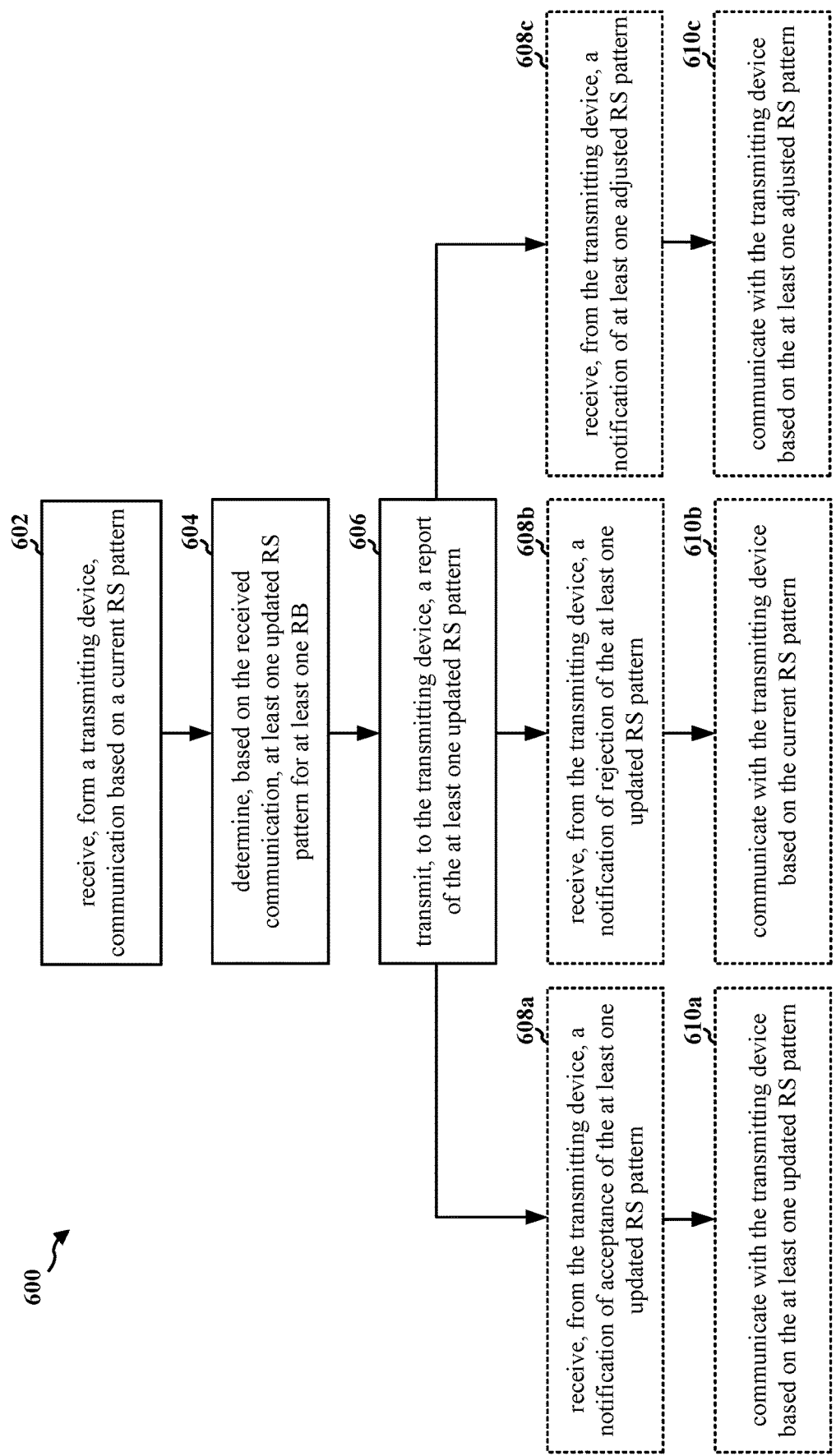
FIG. 6 is a flowchart of a method of wireless communication.

FIG. 6 is a flowchart 600 of a method of wireless communication. The method may be performed by a receiving device, such as the receiving device 404, which may correspond to a UE (e.g., the UE 104; the apparatus 802) or a base station (e.g., the base station 102/180; the apparatus 902). At 602, the receiving device may receive, from a transmitting device, communication based on a current RS pattern. The current RS pattern may be predefined or pre-configured. For example, when the receiving device corresponds to a UE, 602 may be performed by the current RS component 840 via the reception component 830. When the receiving device corresponds to a base station, 602 may be performed by the current RS component 940 via the reception component 930.

At 604, the receiving device may determine, based on the received communication, at least one updated RS pattern for at least one RB. The at least one updated RS pattern may include at least one updated EPRE value for one or more RS tones. The at least one updated RS pattern may be determined based on a machine learning algorithm or a neural network. Determining the at least one updated RS pattern may further comprise mapping the at least one updated RS pattern for the at least one RB. For example, when the receiving device corresponds to a UE, 604 may be performed by the updated RS component 842. When the receiving device corresponds to a base station, 604 may be performed by the updated RS component 942. At 606, the receiving device may transmit, to the transmitting device, a report of the at least one updated RS pattern. The report may correspond to at least one of an absolute value or a relative value of the at least one updated EPRE value for the one or more RS tones. For example, when the receiving device corresponds to a UE, 606 may be performed by the report component 844 via the transmission component 834. When the receiving device corresponds to a base station, 606 may be performed by the report component 944 via the transmission component 934.

Depending on a determination about the RS pattern to be utilized made at the transmitting device, in one aspect, at 608a, the receiving device may receive, from the transmitting device, a notification of acceptance of the at least one updated RS pattern. For example, when the receiving device corresponds to a UE, 608a may be performed by the notification component 848 via the reception component 830. When the receiving device corresponds to a base station, 608a may be performed by the notification component 948 via the reception component 930. Finally, at 610a, the receiving device may communicate with the transmitting device based on the at least one updated RS pattern. For example, when the receiving device corresponds to a UE, 610a may be performed by the communication component 850 via the reception component 830 and the transmission component 834. When the receiving device corresponds to a base station, 610a may be performed by the communication component 950 via the reception component 930 and the transmission component 934.

Depending on the determination about the RS pattern to be utilized made at the transmitting device, in another aspect, at 608b, the receiving device may receive, from the transmitting device, a notification of rejection of the at least one updated RS pattern. For example, when the receiving device corresponds to a UE, 608b may be performed by the notification component 848 via the reception component 830. When the receiving device corresponds to a base station, 608b may be performed by the notification component 948 via the reception component 930. Finally, at 610b, the receiving device may communicate with the transmitting device based on the current RS pattern. For example, when the receiving device corresponds to a UE, 610b may be performed by the communication component 850 via the reception component 830 and the transmission component 834. When the receiving device corresponds to a base station, 610b may be performed by the communication component 950 via the reception component 930 and the transmission component 934.

Depending on the determination about the RS pattern to be utilized made at the transmitting device, in yet another aspect, at 608c, the receiving device may receive, from the transmitting device, a notification of at least one adjusted RS pattern. The at least one adjusted RS pattern may be based on the at least one updated RS pattern. For example, when the receiving device corresponds to a UE, 608c may be performed by the notification component 848 via the reception component 830. When the receiving device corresponds to a base station, 608c may be performed by the notification component 948 via the reception component 930. Finally, at 610c, the receiving device may communicate with the transmitting device based on the at least one adjusted RS pattern. For example, when the receiving device corresponds to a UE, 610c may be performed by the communication component 850 via the reception component 830 and the transmission component 834. When the receiving device corresponds to a base station, 610c may be performed by the communication component 950 via the reception component 930 and the transmission component 934.

In one aspect, the report transmitted at 606 may comprise one or more absolute updated EPRE values each corresponding to one of one or more units of first RS tones of the one or more RS tones. The report may further comprise an indication of the one or more absolute updated EPRE values. In one aspect, at least one of the one or more units of first RS tones may be associated with a first frequency resource index or a last frequency resource index.

The report may further comprise one or more relative updated EPRE values each corresponding to one of one or more units of second RS tones of the one or more RS tones. Each of the one or more relative updated EPRE values may indicate a difference with respect to either one of the one or more absolute updated EPRE values or another relative updated EPRE value. The another relative updated EPRE value may correspond to another unit of second RS tones either neighboring in frequency or immediately preceding in time.

Each of the one or more units of first RS tones may correspond to one of a single first RS tone, a set of consecutive first RS tones, first RS tones in a single first RB of the at least one RB, or first RS tones in a set of consecutive first RBs of the at least one RB. Each of the one or more units of second RS tones may correspond to one of a single second RS tone, a set of consecutive second RS tones, second RS tones in a single second RB of the at least one RB, or second RS tones in a set of consecutive second RBs of the at least one RB.

In one aspect, the report may indicate that at least one of the one or more RS tones is associated with a zero EPRE value.

Figure 7:
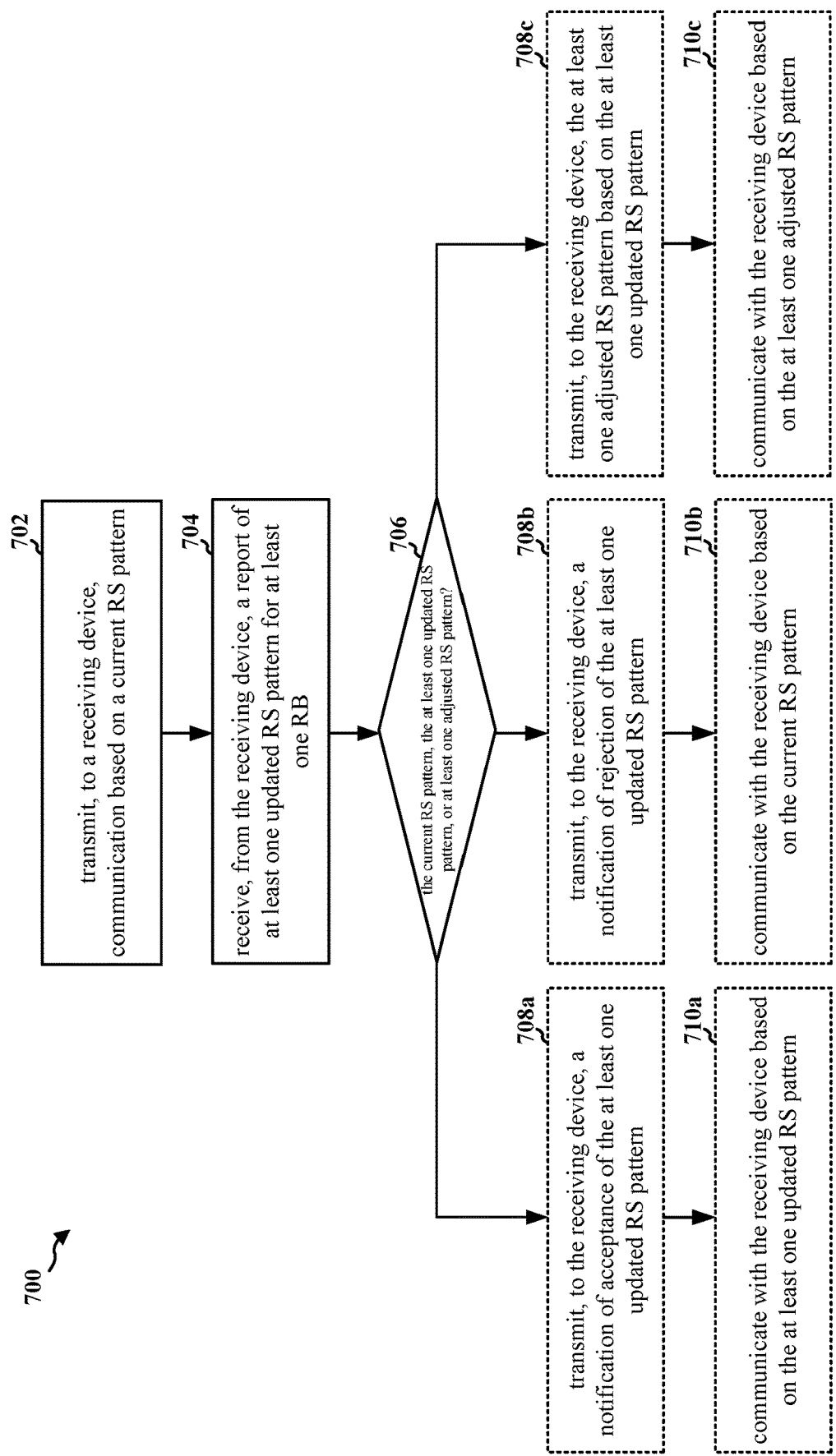
FIG. 7 is a flowchart of a method of wireless communication.

FIG. 7 is a flowchart 700 of a method of wireless communication. The method may be performed by a transmitting device, such as the transmitting device 402, which may correspond to a UE (e.g., the UE 104; the apparatus 802) or a base station (e.g., the base station 102/180; the apparatus 902). At 702, the transmitting device may transmit, to a receiving device, communication based on a current RS pattern. The current RS pattern may be predefined or preconfigured. For example, when the transmitting device corresponds to a UE, 702 may be performed by the current RS component 840 via the transmission component 834. When the transmitting device corresponds to a base station, 702 may be performed by the current RS component 940 via the transmission component 934.

At 704, the transmitting device may receive, from the receiving device, a report of at least one updated RS pattern for at least one RB. The report may correspond to at least one of an absolute value or a relative value of at least one updated EPRE value for one or more RS tones. The at least one updated RS pattern may be based on a machine learning algorithm or a neural network. The at least one updated RS pattern may be mapped for the at least one RB. For example, when the transmitting device corresponds to a UE, 704 may be performed by the report component 844. When the transmitting device corresponds to a base station, 704 may be performed by the report component 944. At 706, the transmitting device may determine, based on the received report, whether to communicate with the receiving device based on the current RS pattern, the at least one updated RS pattern, or at least one adjusted RS pattern based on the at least one updated RS pattern. For example, when the transmitting device corresponds to a UE, 706 may be performed by the selection component 846. When the transmitting device corresponds to a base station, 706 may be performed by the selection component 946.

Based on the determination at 706, in one aspect, at 708a, the transmitting device may transmit, from the receiving device, a notification of acceptance of the at least one updated RS pattern. For example, when the transmitting device corresponds to a UE, 708a may be performed by the notification component 848 via the transmission component 834. When the transmitting device corresponds to a base station, 708a may be performed by the notification component 948 via the transmission component 934. Finally, at 710a, the transmitting device may communicate with the receiving device based on the at least one updated RS pattern. For example, when the transmitting device corresponds to a UE, 710a may be performed by the communication component 850 via the reception component 830 and the transmission component 834. When the transmitting device corresponds to a base station, 710a may be performed by the communication component 950 via the reception component 930 and the transmission component 934.

Based on the determination at 706, in another aspect, at 708b, the transmitting device may transmit, to the receiving device, a notification of rejection of the at least one updated RS pattern. For example, when the transmitting device corresponds to a UE, 708b may be performed by the notification component 848 via the transmission component 834. When the transmitting device corresponds to a base station, 708b may be performed by the notification component 948 via the transmission component 934. Finally, at 710b, the transmitting device may communicate with the receiving device based on the current RS pattern. For example, when the transmitting device corresponds to a UE, 710b may be performed by the communication component 850 via the reception component 830 and the transmission component 834. When the transmitting device corresponds to a base station, 710b may be performed by the communication component 950 via the reception component 930 and the transmission component 934.

Based on the determination at 706, in yet another aspect, at 708c, the transmitting device may transmit, to the receiving device, a notification of at least one adjusted RS pattern. The at least one adjusted RS pattern may be based on the at least one updated RS pattern. For example, when the transmitting device corresponds to a UE, 708c may be performed by the notification component 848 via the transmission component 834. When the transmitting device corresponds to a base station, 708c may be performed by the notification component 948 via the transmission component 934. Finally, at 710c, the transmitting device may communicate with the receiving device based on the at least one adjusted RS pattern. For example, when the transmitting device corresponds to a UE, 710c may be performed by the communication component 850 via the reception component 830 and the transmission component 834. When the transmitting device corresponds to a base station, 710c may be performed by the communication component 950 via the reception component 930 and the transmission component 934.

In one aspect, the report received at 704 may comprise one or more absolute updated EPRE values each corresponding to one of one or more units of first RS tones of the one or more RS tones. The report may further comprise an indication of the one or more absolute updated EPRE values. In one aspect, at least one of the one or more units of first RS tones may be associated with a first frequency resource index or a last frequency resource index.

The report may further comprise one or more relative updated EPRE values each corresponding to one of one or more units of second RS tones of the one or more RS tones. Each of the one or more relative updated EPRE values may indicate a difference with respect to either one of the one or more absolute updated EPRE values or another relative updated EPRE value. The another relative updated EPRE value may correspond to another unit of second RS tones either neighboring in frequency or immediately preceding in time.

Each of the one or more units of first RS tones may correspond to one of a single first RS tone, a set of consecutive first RS tones, first RS tones in a single first RB of the at least one RB, or first RS tones in a set of consecutive first RBs of the at least one RB. Each of the one or more units of second RS tones may correspond to one of a single second RS tone, a set of consecutive second RS tones, second RS tones in a single second RB of the at least one RB, or second RS tones in a set of consecutive second RBs of the at least one RB.

In one aspect, the report may indicate that at least one of the one or more RS tones is associated with a zero EPRE value.

Figure 8:
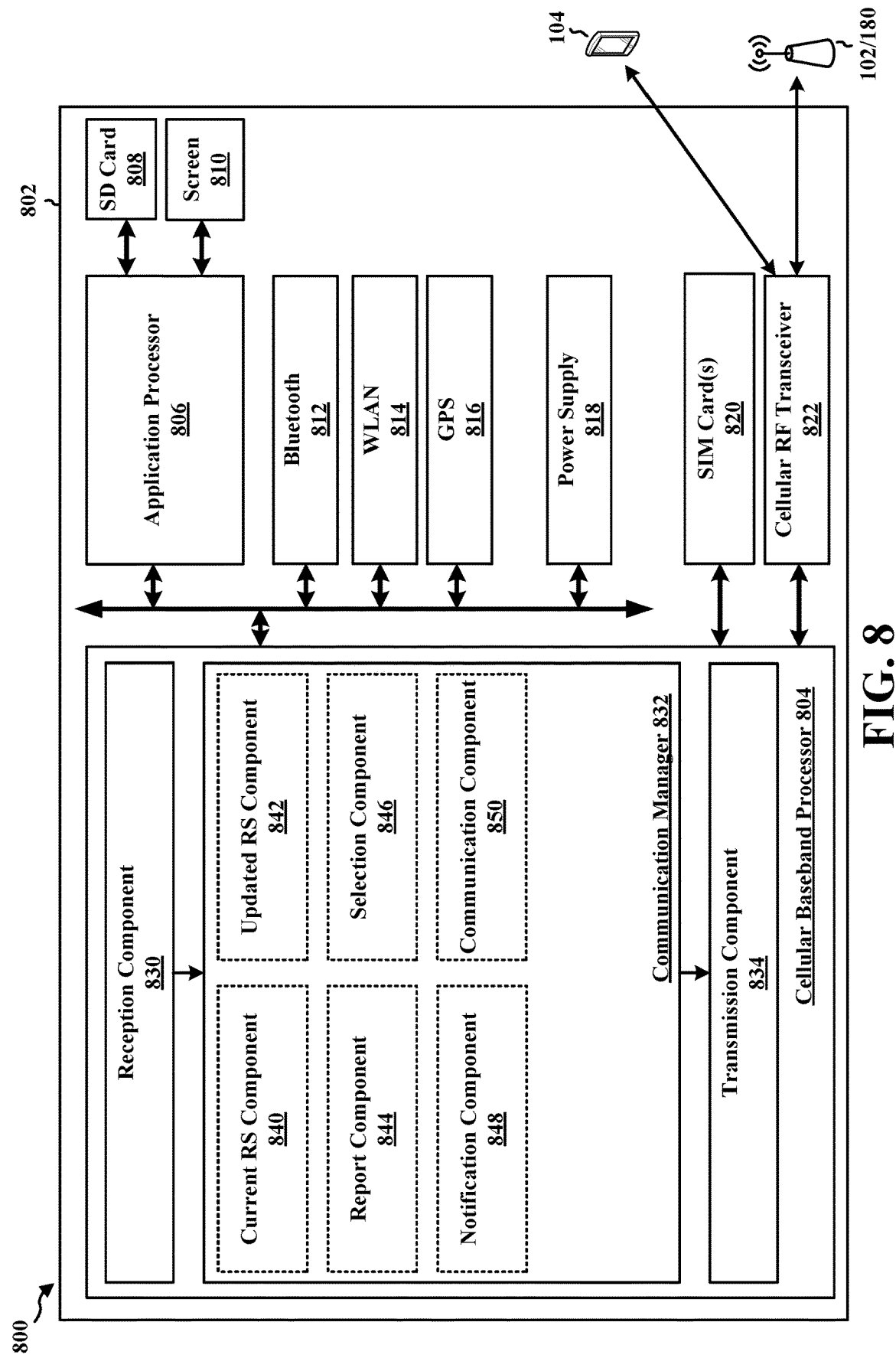
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

When the apparatus 802 corresponds to the receiving device, the communication manager 832 includes a current RS component 840 that may receive, from a transmitting device, communication based on a current RS pattern, e.g., as described in connection with 602 of FIG. 6. The communication manager 832 further includes an updated RS component 842 that may determine, based on the received communication, at least one updated RS pattern for at least one RB, e.g., as described in connection with 604 of FIG. 6. The communication manager 832 further includes a report component 844 that may transmit, to the transmitting device, a report of the at least one updated RS pattern, e.g., as described in connection with 606 of FIG. 6.

When the apparatus 802 corresponds to the transmitting device, the communication manager 832 includes a current RS component 840 that may transmit, to a receiving device, communication based on a current RS pattern, e.g., as described in connection with 702 of FIG. 7. The communication manager 832 further includes a report component 844 that may receive, from the receiving device, a report of at least one updated RS pattern for at least one RB, e.g., as described in connection with 704 of FIG. 7. The communication manager 832 further includes a selection component 846 that may determine, based on the received report, whether to communicate with the receiving device based on the current RS pattern, the at least one updated RS pattern, or at least one adjusted RS pattern based on the at least one updated RS pattern, e.g., as described in connection with 706 of FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes, when the apparatus 802 corresponds to the receiving device, means for receiving, from a transmitting device, communication based on a current RS pattern; means for determining, based on the received communication, at least one updated RS pattern for at least one RB, the at least one updated RS pattern including at least one updated EPRE value for one or more RS tones; and means for transmitting, to the transmitting device, a report of the at least one updated RS pattern, the report corresponding to at least one of an absolute value or a relative value of the at least one updated EPRE value for the one or more RS tones; and when the apparatus 802 corresponds to the transmitting device, means for transmitting, to a receiving device, communication based on a current RS pattern; means for receiving, from the receiving device, a report of at least one updated RS pattern for at least one RB, the report corresponding to at least one of an absolute value or a relative value of at least one updated EPRE value for one or more RS tones; and means for determining, based on the received report, whether to communicate with the receiving device based on the current RS pattern, the at least one updated RS pattern, or at least one adjusted RS pattern based on the at least one updated RS pattern. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
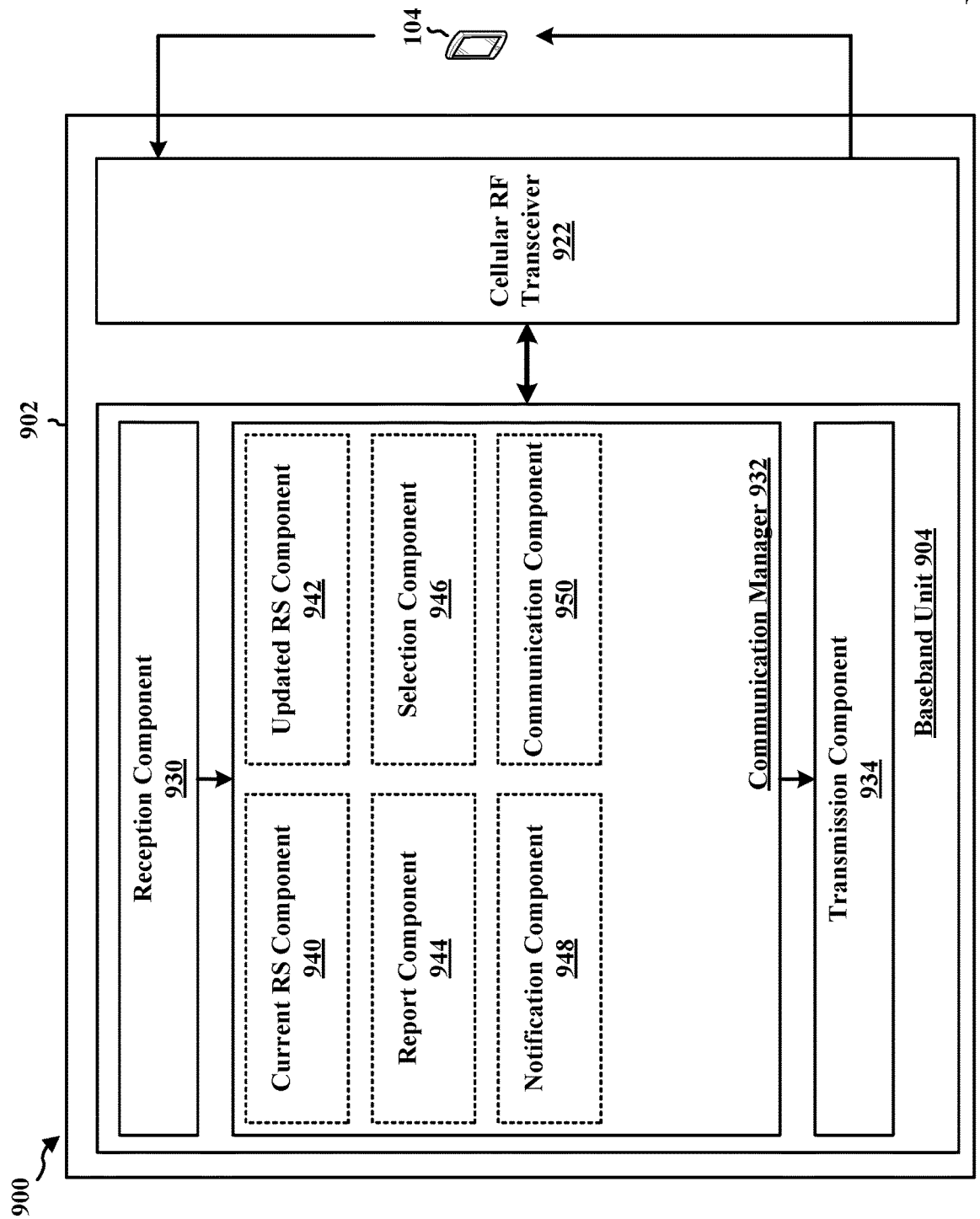
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

When the apparatus 902 corresponds to the receiving device, the communication manager 932 includes a current RS component 940 that may receive, from a transmitting device, communication based on a current RS pattern, e.g., as described in connection with 602 of FIG. 6. The communication manager 932 further includes an updated RS component 942 that may determine, based on the received communication, at least one updated RS pattern for at least one RB, e.g., as described in connection with 604 of FIG. 6. The communication manager 932 further includes a report component 944 that may transmit, to the transmitting device, a report of the at least one updated RS pattern, e.g., as described in connection with 606 of FIG. 6.

When the apparatus 902 corresponds to the transmitting device, the communication manager 932 includes a current RS component 940 that may transmit, to a receiving device, communication based on a current RS pattern, e.g., as described in connection with 702 of FIG. 7. The communication manager 932 further includes a report component 944 that may receive, from the receiving device, a report of at least one updated RS pattern for at least one RB, e.g., as described in connection with 704 of FIG. 7. The communication manager 932 further includes a selection component 946 that may determine, based on the received report, whether to communicate with the receiving device based on the current RS pattern, the at least one updated RS pattern, or at least one adjusted RS pattern based on the at least one updated RS pattern, e.g., as described in connection with 706 of FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes, when the apparatus 902 corresponds to the receiving device, means for receiving, from a transmitting device, communication based on a current RS pattern; means for determining, based on the received communication, at least one updated RS pattern for at least one RB, the at least one updated RS pattern including at least one updated EPRE value for one or more RS tones; and means for transmitting, to the transmitting device, a report of the at least one updated RS pattern, the report corresponding to at least one of an absolute value or a relative value of the at least one updated EPRE value for the one or more RS tones; and when the apparatus 902 corresponds to the transmitting device, means for transmitting, to a receiving device, communication based on a current RS pattern; means for receiving, from the receiving device, a report of at least one updated RS pattern for at least one RB, the report corresponding to at least one of an absolute value or a relative value of at least one updated EPRE value for one or more RS tones; and means for determining, based on the received report, whether to communicate with the receiving device based on the current RS pattern, the at least one updated RS pattern, or at least one adjusted RS pattern based on the at least one updated RS pattern. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

A receiving device may derive an optimized custom RS pattern based on communications between the receiving device and a transmitting device and a machine learning or neural network technique. The RS pattern may include EPRE values for the RS tones contained therein. The receiving device may communicate the custom RS pattern including the EPRE values to the transmitting device in a report to enable optimized RS-based measurements and improve the communications between the devices. Including absolute values for all the EPRE values in the report may lead to large communication overhead associated with transmitting the report. According to aspects, the receiving device may include relative values for some EPRE values and at least one absolute value for an EPRE value in the report, such that the communication overhead associated with transmitting the RS pattern report may be reduced.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a receiving device, comprising receiving, from a transmitting device, communication based on a current reference signal (RS) pattern; determining, based on the received communication, at least one updated RS pattern for at least one resource block (RB), the at least one updated RS pattern including at least one updated energy per resource element (EPRE) value for one or more RS tones; and transmitting, to the transmitting device, a report of the at least one updated RS pattern, the report corresponding to at least one of an absolute value or a relative value of the at least one updated EPRE value for the one or more RS tones.

Aspect 2 is the method of aspect 1, further including receiving, from the transmitting device, a notification of acceptance of the at least one updated RS pattern; and communicating with the transmitting device based on the at least one updated RS pattern.

Aspect 3 is the method of aspect 1, further including receiving, from the transmitting device, a notification of rejection of the at least one updated RS pattern; and communicating with the transmitting device based on the current RS pattern.

Aspect 4 is the method of aspect 1, further including receiving, from the transmitting device, a notification of at least one adjusted RS pattern, the at least one adjusted RS pattern being based on the at least one updated RS pattern; and communicating with the transmitting device based on the at least one adjusted RS pattern.

Aspect 5 is the method of any of aspects 1 to 4, where the current RS pattern is predefined or preconfigured.

Aspect 6 is the method of any of aspects 1 to 5, where the at least one updated RS pattern is determined based on a machine learning algorithm or a neural network.

Aspect 7 is the method of any of aspects 1 to 6, where the determining the at least one updated RS pattern further includes mapping the at least one updated RS pattern for the at least one RB.

Aspect 8 is the method of any of aspects 1 to 7, where the report comprises one or more absolute updated EPRE values each corresponding to one of one or more units of first RS tones of the one or more RS tones.

Aspect 9 is the method of aspect 8, where the report further comprises an indication of the one or more absolute updated EPRE values.

Aspect 10 is the method of any of aspects 8 and 9, where at least one of the one or more units of first RS tones is associated with a first frequency resource index or a last frequency resource index.

Aspect 11 is the method of any of aspects 8 to 10, where the report further comprises one or more relative updated EPRE values each corresponding to one of one or more units of second RS tones of the one or more RS tones.

Aspect 12 is the method of aspect 11, where each of the one or more relative updated EPRE values indicates a difference with respect to either one of the one or more absolute updated EPRE values or another relative updated EPRE value, the another relative updated EPRE value corresponding to another unit of second RS tones either neighboring in frequency or immediately preceding in time.

Aspect 13 is the method of any of aspects 11 and 12, where each of the one or more units of first RS tones corresponds to one of a single first RS tone, a set of consecutive first RS tones, first RS tones in a single first RB of the at least one RB, or first RS tones in a set of consecutive first RBs of the at least one RB, and each of the one or more units of second RS tones corresponds to one of a single second RS tone, a set of consecutive second RS tones, second RS tones in a single second RB of the at least one RB, or second RS tones in a set of consecutive second RBs of the at least one RB.

Aspect 14 is the method of any of aspects 1 to 13, where the report indicates that at least one of the one or more RS tones is associated with a zero EPRE value.

Aspect 15 is the method of any of aspects 1 to 14, where the current RS pattern and the at least one updated RS pattern correspond to at least one of a demodulation reference signal (DMRS), a phase tracking reference signal (PTRS), a channel state information reference signal (CSI-RS), a tracking referencing signal (TRS), or a sounding reference signal (SRS).

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

Aspect 19 is a method of wireless communication of a transmitting device, comprising transmitting, to a receiving device, communication based on a current reference signal (RS) pattern; receiving, from the receiving device, a report of at least one updated RS pattern for at least one resource block (RB), the report corresponding to at least one of an absolute value or a relative value of at least one updated energy per resource element (EPRE) value for one or more RS tones; and determining, based on the received report, whether to communicate with the receiving device based on the current RS pattern, the at least one updated RS pattern, or at least one adjusted RS pattern based on the at least one updated RS pattern.

Aspect 20 is the method of aspect 19, further including transmitting, to the receiving device, a notification of acceptance of the at least one updated RS pattern; and communicating with the receiving device based on the at least one updated RS pattern.

Aspect 21 is the method of aspect 19, further including transmitting, to the receiving device, a notification of rejection of the at least one updated RS pattern; and communicating with the receiving device based on the current RS pattern.

Aspect 22 is the method of aspect 19, further including transmitting, to the receiving device, the at least one adjusted RS pattern based on the at least one updated RS pattern; and communicating with the receiving device based on the at least one adjusted RS pattern.

Aspect 23 is the method of any of aspects 19 to 22, where the current RS pattern is predefined or preconfigured.

Aspect 24 is the method of any of aspects 19 to 23, where the at least one updated RS pattern is based on a machine learning algorithm or a neural network.

Aspect 25 is the method of any of aspects 19 to 24, where the at least one updated RS pattern is mapped for the at least one RB.

Aspect 26 is the method of any of aspects 19 to 25, where the report comprises one or more absolute updated EPRE values each corresponding to one of one or more units of first RS tones of the one or more RS tones.

Aspect 27 is the method of aspect 26, where the report further comprises an indication of the one or more absolute updated EPRE values.

Aspect 28 is the method of any of aspects 26 and 27, where at least one of the one or more units of first RS tones is associated with a first frequency resource index or a last frequency resource index.

Aspect 29 is the method of any of aspects 26 to 28, where the report further comprises one or more relative updated EPRE values each corresponding to one of one or more units of second RS tones of the one or more RS tones.

Aspect 30 is the method of aspect 29, where each of the one or more relative updated EPRE values indicates a difference with respect to either one of the one or more absolute updated EPRE values or another relative updated EPRE value, the another relative updated EPRE value corresponding to another unit of second RS tones either neighboring in frequency or immediately preceding in time.

Aspect 31 is the method of any of aspects 29 and 30, where each of the one or more units of first RS tones corresponds to one of a single first RS tone, a set of consecutive first RS tones, first RS tones in a single first RB of the at least one RB, or first RS tones in a set of consecutive first RBs of the at least one RB, and each of the one or more units of second RS tones corresponds to one of a single second RS tone, a set of consecutive second RS tones, second RS tones in a single second RB of the at least one RB, or second RS tones in a set of consecutive second RBs of the at least one RB.

Aspect 32 is the method of any of aspects 19 to 31, where the report indicates that at least one of the one or more RS tones is associated with a zero EPRE value.

Aspect 33 is the method of any of aspects 19 to 32, where the current RS pattern and the at least one updated RS pattern correspond to at least one of a demodulation reference signal (DMRS), a phase tracking reference signal (PTRS), a channel state information reference signal (CSI-RS), a tracking referencing signal (TRS), or a sounding reference signal (SRS).

Aspect 34 is an apparatus for wireless communication including at least one processor coupled to a memory and configured to implement a method as in any of aspects 19 to 33.

Aspect 35 is an apparatus for wireless communication including means for implementing a method as in any of aspects 19 to 33.

Aspect 36 is a computer-readable medium storing computer executable code, where the code when executed by a processor causes the processor to implement a method as in any of aspects 19 to 33.

What is claimed is:

1. A method of wireless communication of a receiving device, comprising:
   receiving, from a transmitting device, communication based on a current reference signal (RS) pattern;
   determining, based on the received communication, at least one updated RS pattern for at least one resource block (RB), the at least one updated RS pattern including at least one updated energy per resource element (EPRE) value for one or more RS tones; and transmitting, to the transmitting device, a report of the at least one updated RS pattern, the report corresponding to at least one of an absolute value or a relative value of the at least one updated EPRE value for the one or more RS tones, the report comprising one or more absolute updated EPRE values and one or more relative updated EPRE values, each absolute updated EPRE value of the one or more absolute updated EPRE values corresponding to one of one or more units of first RS tones of the one or more RS tones, each relative updated EPRE value of the one or more relative updated EPRE values corresponding to one of one or more units of second RS tones of the one or more RS tones, at least one of the one or more relative updated EPRE values being relative to one of the one or more absolute updated EPRE values.

2. The method of claim 1, further comprising:
receiving, from the transmitting device, a notification of acceptance of the at least one updated RS pattern; and
communicating with the transmitting device based on the at least one updated RS pattern.

3. The method of claim 1, further comprising:
receiving, from the transmitting device, a notification of rejection of the at least one updated RS pattern; and
communicating with the transmitting device based on the current RS pattern.

4. The method of claim 1, further comprising:
receiving, from the transmitting device, a notification of at least one adjusted RS pattern, the at least one adjusted RS pattern being based on the at least one updated RS pattern; and
communicating with the transmitting device based on the at least one adjusted RS pattern.

5. The method of claim 1, wherein the current RS pattern is predefined or preconfigured.

6. The method of claim 1, wherein the at least one updated RS pattern is determined based on a machine learning algorithm or a neural network.

7. The method of claim 1, wherein the determining the at least one updated RS pattern further comprises mapping the at least one updated RS pattern for the at least one RB.

8. The method of claim 1, wherein the report further comprises an indication of the one or more absolute updated EPRE values.

9. The method of claim 1, wherein at least one of the one or more units of the first RS tones is associated with a first frequency resource index or a last frequency resource index.

10. The method of claim 1, wherein each of the one or more relative updated EPRE values indicates a difference with respect to either one of the one or more absolute updated EPRE values or another relative updated EPRE value, the another relative updated EPRE value corresponding to another unit of the second RS tones either neighboring in frequency or immediately preceding in time.

11. The method of claim 1, wherein each of the one or more units of the first RS tones corresponds to one of a single first RS tone, a set of consecutive first RS tones, the first RS tones in a single first RB of the at least one RB, or the first RS tones in a set of consecutive first RBs of the at least one RB, and each of the one or more units of the second RS tones corresponds to one of a single second RS tone, a set of consecutive second RS tones, the second RS tones in a single second RB of the at least one RB, or the second RS tones in a set of consecutive second RBs of the at least one RB.

12. The method of claim 1, wherein the report indicates that at least one of the one or more RS tones is associated with a zero EPRE value.

13. An apparatus for wireless communication, the apparatus being a receiving device, comprising:
a memory; and
at least one processor coupled to the memory and configured to:
receive, from a transmitting device, communication based on a current reference signal (RS) pattern;
determine, based on the received communication, at least one updated RS pattern for at least one resource block (RB), the at least one updated RS pattern including at least one updated energy per resource element (EPRE) value for one or more RS tones; and
transmit, to the transmitting device, a report of the at least one updated RS pattern, the report corresponding to at least one of an absolute value or a relative value of the at least one updated EPRE value for the one or more RS tones, the report comprising one or more absolute updated EPRE values and one or more relative updated EPRE values, each absolute updated EPRE value of the one or more absolute updated EPRE values corresponding to one of one or more units of first RS tones of the one or more RS tones, each relative updated EPRE value of the one or more relative updated EPRE values corresponding to one of one or more units of second RS tones of the one or more RS tones, at least one of the one or more relative updated EPRE values being relative to one of the one or more absolute updated EPRE values.

14. A method of wireless communication of a transmitting device, comprising:
transmitting, to a receiving device, communication based on a current reference signal (RS) pattern;
receiving, from the receiving device, a report of at least one updated RS pattern for at least one resource block (RB), the report corresponding to at least one of an absolute value or a relative value of at least one updated energy per resource element (EPRE) value for one or more RS tones, the report comprising one or more absolute updated EPRE values and one or more relative updated EPRE values, each absolute updated EPRE value of the one or more absolute updated EPRE values corresponding to one of one or more units of first RS tones of the one or more RS tones, each relative updated EPRE value of the one or more relative updated EPRE values corresponding to one of one or more units of second RS tones of the one or more RS tones, at least one of the one or more relative updated EPRE values being relative to one of the one or more absolute updated EPRE values; and
determining, based on the received report, whether to communicate with the receiving device based on the current RS pattern, the at least one updated RS pattern, or at least one adjusted RS pattern based on the at least one updated RS pattern.

15. The method of claim 14, further comprising:
transmitting, to the receiving device, a notification of acceptance of the at least one updated RS pattern; and
communicating with the receiving device based on the at least one updated RS pattern.

16. The method of claim 14, further comprising:
transmitting, to the receiving device, a notification of rejection of the at least one updated RS pattern; and
communicating with the receiving device based on the current RS pattern.

17. The method of claim 14, further comprising:
transmitting, to the receiving device, the at least one adjusted RS pattern based on the at least one updated RS pattern; and
communicating with the receiving device based on the at least one adjusted RS pattern.

18. The method of claim 14, wherein the current RS pattern is predefined or preconfigured.

19. The method of claim 14, wherein the at least one updated RS pattern is based on a machine learning algorithm or a neural network.

20. The method of claim 14, wherein the at least one updated RS pattern is mapped for the at least one RB.

21. The method of claim 14, wherein the report further comprises an indication of the one or more absolute updated EPRE values.

22. The method of claim 14, wherein at least one of the one or more units of the first RS tones is associated with a first frequency resource index or a last frequency resource index.

23. The method of claim 14, wherein each of the one or more relative updated EPRE values indicates a difference with respect to either one of the one or more absolute updated EPRE values or another relative updated EPRE value, the another relative updated EPRE value corresponding to another unit of the second RS tones either neighboring in frequency or immediately preceding in time.

24. The method of claim 14, wherein each of the one or more units of the first RS tones corresponds to one of a single first RS tone, a set of consecutive first RS tones, the first RS tones in a single first RB of the at least one RB, or the first RS tones in a set of consecutive first RBs of the at least one RB, and each of the one or more units of the second RS tones corresponds to one of a single second RS tone, a set of consecutive second RS tones, the second RS tones in a single second RB of the at least one RB, or the second RS tones in a set of consecutive second RBs of the at least one RB.

25. The method of claim 14, wherein the report indicates that at least one of the one or more RS tones is associated with a zero EPRE value.

26. An apparatus for wireless communication, the apparatus being a transmitting device, comprising:
a memory; and
at least one processor coupled to the memory and configured to:
transmit, to a receiving device, communication based on a current reference signal (RS) pattern;
receive, from the receiving device, a report of at least one updated RS pattern for at least one resource block (RB), the report corresponding to at least one of an absolute value or a relative value of at least one updated energy per resource element (EPRE) value for one or more RS tones, the report comprising one or more absolute updated EPRE values and one or more relative updated EPRE values, each absolute updated EPRE value of the one or more absolute updated EPRE values corresponding to one of one or more units of first RS tones of the one or more RS tones, each relative updated EPRE value of the one or more relative updated EPRE values corresponding to one of one or more units of second RS tones of the one or more RS tones, at least one of the one or more relative updated EPRE values being relative to one of the one or more absolute updated EPRE values; and
determine, based on the received report, whether to communicate with the receiving device based on the current RS pattern, the at least one updated RS pattern, or at least one adjusted RS pattern based on the at least one updated RS pattern.

* * * * *